3,279,935
OXIDATION OF CARBON BLACK
Alton E. Daniell and William R. Peterson, Houston, Tex., assignors to Ashland Oil Refining Company, Houston, Tex., a corporation of Kentucky
No Drawing. Filed June 11, 1963, Ser. No. 286,960
6 Claims. (Cl. 106—307)

This invention relates to the art of treating carbon blacks. In particular, it relates to a new and novel method for the oxidation of carbon blacks.

Carbon blacks are highly desirable ingredients for use in the formulation of black printing inks. In such formulations carbon black is dispersed within liquid systems composed of toners, oil, varnishes or water and other compounds. The vehicle component is selectively adsorbed on the surface of the black, thus permitting the black to be thoroughly wetted so that each carbon black particle is surrounded by a layer of certain of the various components of the varnish vehicle. The better the wetting properties the better the lubrication and the easier and more uniform the dispersion of the carbon black within the ink formulations. The wetting property of a carbon black is directly related to its degree of surface oxidation.

That carbon black properties, whether channel, gas furnace or oil furnace carbon blacks, are enhanced, particularly for use in inks, by oxidation as by treatment with oxygen at elevated temperatures has long been known. Such treatment thus oxidizes the carbon at the surface of the individual carbon black particle to build-up, to some extent at least, on the surface of the particles "active sites" or carbon-oxygen complexes believed to consist of oxides and carboxyl groups, among other things. But whatever the precise character of such complexes resulting from this type of oxidation they are manifested by a lowering of pH, and blacks of low pH value are eagerly sought, for example, by ink manufacturers for use in ink formulations.

High surface oxidation, manifested by low pH, then is an important property of carbon blacks, and processes for the treatment of carbon blacks to effect surface oxidation have long been known. Some of the prior art methods employ aqueous solutions of various oxidizing agents—viz. mineral acids, peroxides, salts and the like—for treatment of the carbon blacks. Such contact of the solutions with carbon black however, inter alia, tends to reduce yield by over-oxidation and also tends to form lumps and aggregates of carbon black. Blacks so treated, obviously, lose their loose fluffy character so desirable for pigment grade carbon blacks. Other methods, to avoid direct contact of the carbon black with aqueous or other liquid solutions, have employed gas phase oxidation techniques. Such gas phase methods utilize, e.g., air, ozone, steam and mixtures of air containing certain oxidizing agents such as ozone, nitrogen dioxide and the like. While these methods have met with varying degrees of success they are also not without their shortcomings and there is ample need for new and improved processes.

It is then an object of the present invention to provide a new and novel process for treating carbon blacks to produce surface oxidation. In particular, it is an object to provide a continuous low temperature gas phase oxidation process for the treatment of carbon black wherein the carbon black can be recovered in good yield, if desired, as a loose, fluffy non-pelleted material; or alternately, if desired, the treated carbon black can be recovered as a pelleted product. It is a further object to provide such process which will produce a pigment grade carbon black of stable oxygen content and of low pH which will provide longer flow and greater tinting effect. It is also an object, however, to provide a carbon black product which offers superior reinforcement properties for certain elastomers such as butyl rubber.

These and other objects are achieved in accordance with the present invention comprising contacting carbon black with an oxygen-bearing gas admixed with gaseous peroxide in amount sufficient to oxidize the surface of the carbon black. Suitably, the resultant gaseous mixture should contain at least about 4 percent oxygen by volume. Preferably, however, the gaseous mixture should contain from about 10 percent to about 40 percent oxygen by volume and from about 1.0 percent to about 25 percent peroxide by volume. The temperature at which the oxidation reaction is conducted ranges from about 300° F. to about 800° F.; and preferably, from about 350° F. to about 600° F.

In the use of the peroxide oxygen-bearing gas mixture in effecting carbon black oxidation, it is preferable to contact the carbon black with a sufficient volume of the gas to reduce the pH to a value ranging from about 2.0 to about 3.5 or 4.5, dependent upon the particular intended usage of the oxidized black. In most instances, it is desired to reduce the pH to a value of from about 2.5 to about 3.5, this generally requiring a volume of the gaseous mixture which will provide from about 1 to about 15 weight parts of peroxide, per one hundred weight parts of carbon black under the preferred conditions of operation. The peroxide can be added to the gas by direct vaporization into the gaseous stream; or it can be supplied to the stream by numerous methods within the knowledge of the art—e.g., as by saturation of the stream by the use of gas-liquid contacting devices wherein the peroxide is first put into solution and then contacted with the gas stream.

A feature of this invention is that it permits the use of normal air as the oxygen-bearing gas component of the gaseous mixture to which the desired amount of volatile peroxide can be added. The optimum concentration of the oxygen within the gaseous mixture depends primarily upon the temperature of reaction and upon the concentration of volatile peroxide. For best results, it is found that the oxygen content of the gaseous mixture provided when normal air is employed as the oxygen-bearing gas component is particularly effective at temperatures ranging from about 300° F. to about 800° F. when the concentration of peroxide ranges from about 1 to 10 percent, by volume of the gaseous mixture. Thus, ambient air used pursuant to these conditions is effective and is a highly suitable and preferred oxygen-bearing gas because of its cheapness and availability. With oxygen-bearing gases of higher oxygen concentration, such as oxygen enriched air, the temperature and peroxide concentration of the gaseous mixture can be reduced to some extent and generally similar results attained as when normal air is used at higher temperatures in gaseous mixtures having greater peroxide concentration.

With an oxygen-containing gas, such as air per se, can be contacted with carbon black at very high temperatures at relatively long contact time to produce some oxygen build-up it is indeed remarkable that such small amounts of gaseous hydrogen peroxide admixed therewith can so profoundly and beneficially alter and increase its effectiveness without significant adverse effects. Thus, the pH of the carbon black is rapidly lowered and this, even at low temperatures. Normally, several hours are required to appreciably lower the pH of carbon black, and even so only at relatively high temperatures—viz. on the order of 600° F.–1000° F., and higher. Even then, with the dual requirement of long exposure at high temperature, over-oxidation is often produced, this resulting in a decreased quantum of carbon due to combustion oxidation. In sharp contrast, however, when a gaseous mixture comprising air and as little at 2 percent hydrogen peroxide by volume of the mixture is used, the time required to effect desired oxidation is reduced to as little as one-tenth the time required for air alone. This, moreover, can be accomplished when the temperature is reduced by as much as about thirty-five percent.

The remarkable results achieved pursuant to this invention are indeed surprising because it is known that a peroxide alone, e.g., hydrogen peroxide, under gaseous conditions will not significantly oxidize carbon black in such a manner as to build active sites on the carbon black. In other words, it is known that hydrogen peroxide alone and without oxygen, under the reaction conditions of the present invention will not form carbon-oxygen complexes on the carbon black surface and will not, therefore, significantly lower the pH of the carbon black. If, in fact, any oxidation of the carbon black does occur, it is primarily of a combustion type as opposed to that resulting in build-up of carbon-oxygen complexes. Nor, are the beneficial results of this invention to be attributed to the use of oxygen alone, but rather to the use of a gas mixture comprising both oxygen and gaseous peroxide. Thus, the use of oxygen alone without peroxide cannot account for the high quantum of oxidation achieved; and peroxide alone can account for even less, if any. While applicants do not desire to be bound by theory it is believed that the gaseous peroxide exhibits a catalytic effect in the presence of the carbon and the oxygen of the oxygen-bearing gas. It is theorized that a cleavage effect occurs wherein free hydroxyl radicals are formed from the peroxide rather than molecular water and free oxygen as would be expected. Thus, hydroxyl radicals are formed from the peroxide and these attach directly to the surface of the carbon but in the process the peroxide is regenerated. Moreover, it is believed that the presence of at least a trace amount of water vapor is required to catalyze the carbon black oxidation so as to generate active sites on the black and not simply consume the reactants in a "combustion" process. Good results are achieved when the water vapor supplied to catalyze the oxidation results from the use of aqueous peroxide solutions wherein the peroxide ranges in concentration from about 3 percent to about 90 weight percent peroxide in water. Thus, a desired water vapor concentration within the gaseous mixture is one ranging from about 0.1 part water to about 33 parts water per one part of peroxide.

Peroxides useful in accordance with this invention are those volatile at reaction conditions and characterized by having at least one terminal perhydroxy radical in the molecule. Suitable and preferred compounds are those characterized by having the structural formula:

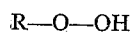

wherein R is hydrogen or

In the acyl or acid radical, $R_1$ is hydrogen or a hydrocarbon radical containing from 1 to about 12 carbon atoms and these can be, e.g., alkyl, aryl, aralkyl, alkyaryl and the like. The hydrocarbon radicals can also be substituted or unsubstituted provided that where substituted the substituting groups do not essentially alter the normal properties of the radical and remain substantially inert in the reaction. Exemplary of such compounds are such hydroperoxides as methyl hydrogen peroxide, n-butyl hydrogen peroxide, n-octyl hydrogen peroxide, 3-butylhexyl hydrogen peroxide, phenyl hydrogen peroxide, tolyl hydrogen peroxide, benzyl hydrogen peroxide; and such peroxy acids as peroxy butyric acid, peroxy caproic acid, peroxy heptanoic acid, peroxy benzoic acid and the like.

An outstanding member of this class of compounds is hydrogen peroxide. This compound is, inter alia, particularly effective in treating the carbon black, especially from a cost-effectiveness standpoint. Its high degree of effectiveness is probably due to the fact that the total molecule is cleaved entirely to hydroxyl radicals under reaction conditions. Hydrogen peroxide is not only readily available at low cost but also offers many process advantages.

The following non-limiting examples demonstrate the high amount of oxidation achieved pursuant to the practice of this invention. These examples are compared and contrasted with runs not of this invention to exemplify the remarkably surprising and outstandingly unique results achieved according to this invention.

*Example 1*

To a reactor is charged a weighed quantity of commercial furnace grade carbon black offered under the trademark Kosmos–60. After start-up the carbon black, in fluidized form, is supported upon a perforated stainless steel bed support at the bottom of the reactor wherein enters a hot air stream from an air line passed through a preheater. The air line is provided with an entry feature for injection therein of peroxide for enrichment of the preheated air. A small amount of water vapor is also introduced. At the top of the reactor is located a cyclone separator which prevents escape of the carbon black from the reactor, though yet permitting escape means for the off-gas.

To the fluidized reactor, for a 4-hour period, is fed air enriched with a sufficient quantity of hydrogen peroxide to provide 4.4 percent hydrogen peroxide, based on the weight of the carbon black within the reactor. The hot air blast at 400° F. intimately contacts the black and maintains it in fluidized condition while affecting its surface oxidation.

At the end of the period a portion of the carbon black is removed from the reactor. Then 4 parts of the carbon black is added to 20 parts of water and boiled for 10 minutes. At the end of this time the slurry is allowed to cool to room temperature. The pH of the slurry is found to be 3.7. This is sharply contrasted with the initial pH of the carbon black which is 8.3. Thus, it is shown that a high degree of surface oxidation of the carbon black has been effected.

In sharp contrast, however, when the foregoing is repeated in precise detail with the same carbon black under the same process conditions but with omission of the hydrogen peroxide and, even when raising the temperature of the air to 605° F. the pH imported by a corresponding portion of the black to the resultant aqueous solution is found to be only 7.1. This is in striking contrast to the pH of 3.7 found in the foregoing. Moreover, even when the reaction time is doubled the pH is only slightly further lowered. Thus, the end of an 8 hour period at 600° F. the pH is reduced to only 5.4. This conclusively shows the highly beneficial effects of small amounts of gaseous hydrogen peroxide admixed with air for affecting the desired oxidation.

Gaseous hydrogen peroxide per se as is known does not account for this oxidation, even though it is an essential component to catalyze the reaction. To demonstrate this a similar carbon black is contacted with nitrogen gas enriched with hydrogen peroxide. The peroxide is used in even greater amount and the reaction is conducted at an even higher temperature. Thus, nitrogen gas is admixed with a sufficient quantity of hydrogen peroxide to provide 6.4 percent hydrogen peroxide, based on the weight of the carbon black, and contacted with the carbon which is contained within a PAAR reactor. The reaction is conducted for a 4 hour period at a temperature of 662° F. At the end of this period it is found that the pH of the carbon black is only 7.1. This pH is in striking contrast with the low pH of 3.7 obtained in accordance with the present invention.

*Example II*

When the foregoing example is repeated in all details except that the concentration within the air of the hydrogen peroxide, based on the weight of the carbon black, is trebled the pH of the carbon black is reduced even further.

*Example III*

Into a Roto-Louvre Dryer is charged a commercial grade of carbon black pellets, providing a pH the same as that carbon black of Example I. The Roto-Louvre Dryer, as known, is a hollow cylindrical retort within the interior of which is placed the carbon black. The dryer is externally heated to a temperature of 400° F. and rotated about its axis to continuously expose fresh surfaces of the carbon black to a continuous hot blast of 400° F. air enriched with peracetic acid. The air is sufficiently enriched with the peracetic acid to provide 7.9 percent of peracetic acid based on the weight of the carbon black. At the end of a four hour period the pH of the carbon black is found to be less than 5.

When the foregoing is repeated using performic acid in lieu of peracetic acid good results are again obtained.

Good results are also obtained when cumene hydroperoxide and butyl hydroperoxide, respectively, are used in lieu of peracetic acid in the foregoing.

It is apparent that the present invention is subject to considerable variation without departing its spirit and scope and accordingly the appended claims are to be construed broadly in accordance with the precepts discussed in the specification.

We claim:

1. A process for oxidizing a finely divided carbon black having an alkaline pH characteristic which comprises: passing a preheated stream of a gaseous oxidizing mixture comprising about 10–40% by volume of oxygen, about 1.0–25% by volume of hydrogen peroxide, and at least a trace of water vapor through a body of said carbon black whereby said body of carbon black is fluidized by said stream and subjected to the oxidizing action thereof, the preheat temperature of said stream being such as to maintain said carbon black at a temperature of 350–600° F. and the volume of said stream being sufficient to reduce the pH characteristic of said carbon black to about 2.0–3.5.

2. A process for oxidizing a carbon black having an alkaline pH characteristic which comprises: subjecting said carbon black at a temperature of about 300–800° F. to the action of a stream of a gaseous oxidizing mixture comprising at least about 4.0%–40% by volume oxygen, about 1–25% by volume of a volatile peroxide having at least one terminal perhydroxy radical and at least a trace of water vapor, the volume of said stream of gaseous oxidizing mixture to which said carbon black is subjected being sufficient to reduce the pH characteristic of said carbon black to about 2.0, less than 5.

3. A process according to claim 2 in which the volatile peroxide is hydrogen peroxide.

4. A process according to claim 2 in which the volume of said stream of gaseous oxidizing mixture to which said carbon black is subjected is sufficient to reduce the pH characteristic thereof to about 2.0–3.5.

5. A process according to claim 2 wherein said gaseous oxidizing mixture includes air, said peroxide and said water vapor.

6. A process according to claim 5 wherein said mixture contains about 1–10% by volume of said peroxide.

References Cited by the Examiner

UNITED STATES PATENTS

| 2,707,674 | 5/1955 | Sweitzer | 106—307 |
| 3,023,118 | 2/1962 | Donnet | 106—307 |

TOBIAS E. LEVOW, *Primary Examiner.*

J. POER, S. E. MOTT, *Assistant Examiners.*